(12) United States Patent
Huenner et al.

(10) Patent No.: US 6,707,171 B1
(45) Date of Patent: Mar. 16, 2004

(54) SHORT-CIRCUITING DEVICE

(75) Inventors: Martin Huenner, Erlangen (DE); Ulrich Schmidt, Forchheim (DE); Egid Schneider, Weisendorf (DE); Markus Zachmeier, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 118 days.

(21) Appl. No.: 10/030,980

(22) PCT Filed: Jul. 13, 2000

(86) PCT No.: PCT/DE00/02297

§ 371 (c)(1),
(2), (4) Date: May 3, 2002

(87) PCT Pub. No.: WO01/06610

PCT Pub. Date: Jan. 25, 2001

(30) Foreign Application Priority Data

Jul. 16, 1999 (DE) .......................... 199 33 803

(51) Int. Cl.⁷ .............................................. H01H 19/64
(52) U.S. Cl. ........................... 307/113; 307/130; 361/54
(58) Field of Search ................................. 307/113, 116, 307/125, 130; 361/78, 86, 88, 91.1, 2, 3, 6, 8, 13, 54

(56) References Cited

U.S. PATENT DOCUMENTS

| 3,982,137 A | * | 9/1976 | Penrod | 361/8 |
| 4,451,866 A | | 5/1984 | Cinquin et al. | |
| 4,500,934 A | * | 2/1985 | Kinsinger | 361/3 |
| 5,117,323 A | * | 5/1992 | Asplund | 361/47 |
| 5,272,617 A | * | 12/1993 | Nakamura | 363/51 |
| 5,699,218 A | * | 12/1997 | Kadah | 361/13 |
| 5,777,834 A | * | 7/1998 | Lehner et al. | 361/66 |
| 5,790,354 A | * | 8/1998 | Altiti et al. | 361/8 |

FOREIGN PATENT DOCUMENTS

| CA | 1307822 | 10/1986 |
| DE | 198 37 628 A1 | 3/2000 |
| EP | 0 064 016 A1 | 11/1982 |
| EP | 0 806 071 B1 | 11/1997 |

OTHER PUBLICATIONS

W. Dombrowsky, "Erdungskurzschliesser Für Gleichstrombahnen", pp. 48–50, 2/97.
Siemens, "Kurzschliesser Sitras SCD–T Spannungsbegrenzungseinrichtung Für DC–Bahnanlagen", No Date.

* cited by examiner

*Primary Examiner*—Gregory J. Toatley, Jr.
*Assistant Examiner*—Sharon A. Polk
(74) *Attorney, Agent, or Firm*—Young & Thompson

(57) ABSTRACT

In a device for the short-circuiting of a first electrical line (1) with a second electrical line (2) by at least one mechanical switching device (SM), at least one first electronic switching device (SE1) is arranged in parallel with the mechanical switching device (SM) and at least one second electronic switching device (SE2) is arranged reverse-connected in parallel with said first electronic switching device, by means of which a voltage difference that occurs between the first electrical line (1) and the second electrical line (2) can be bridged. Such a device is constructed in a simple manner and has short response times.

9 Claims, 1 Drawing Sheet

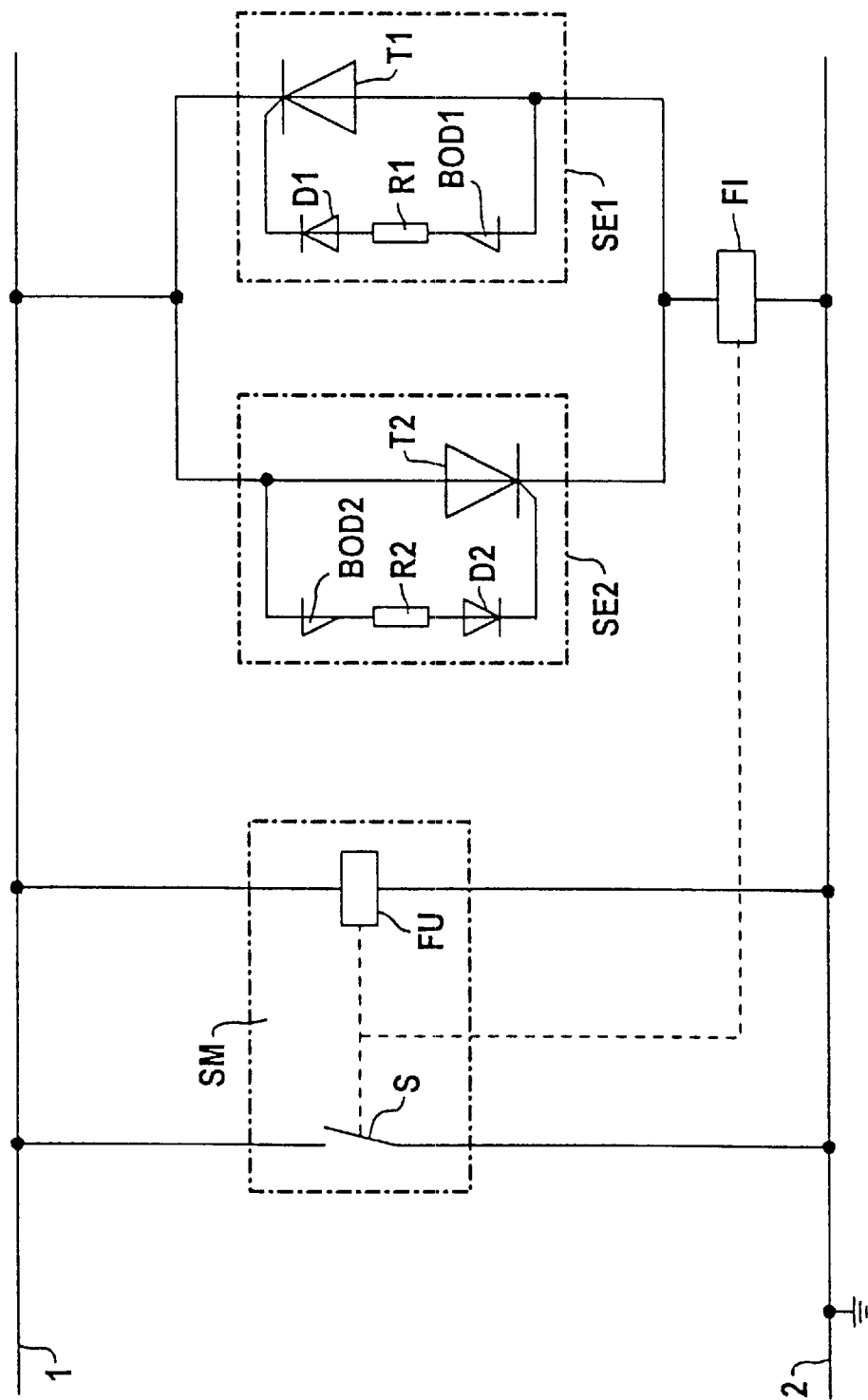

SHORT-CIRCUITING DEVICE

The invention relates to a device for short-circuiting a first electrical line with a second electrical line, it being possible for the first electrical line and the second electrical line to be short-circuited by a mechanical switching device.

Such short-circuiting devices are known e.g. from Siemens product information "Short-circuiter SITRAS®SCD96 voltage limiting device for DC railroad installations", Order No. A52811-C2720-D11-A5-00B1. The known short-circuiting devices are used in railroad power supply installations. In the case of a DC supply, the first electrical line is in this case formed by the return line (which is the rail in DC railroad installations) and the second electrical line is formed by the grounding line.

In the event of insulator flashovers, in the event of flashovers on horn arresters of the overhead-contact line installation and in the event of other undesired connections between the overhead-contact wire voltage of, for example, 1500 volts DC voltage and grounded installation components, voltages of up to a maximum of 1500 volts occur between the rails, which form the return lines, and the grounding installation. This means that, firstly, impermissible contact voltages can occur on the return line. Secondly, assemblies which are connected to the rails and whose withstand voltage is insufficient can be destroyed. If the arcs are not extinguished owing to the grid follow currents or the short circuits persist for other reasons, the electromechanical switching device of the short-circuiter intervenes after a response time of 60 milliseconds, for example, and connects return line and grounding installation. The section protection triggers in the event of faults of high current intensity.

EP-B 0 806 071 discloses a short-circuiting device in which a first electrical line can be short-circuited with a second electrical line by means of an electromechanical short-circuiting bridge which is driven in a complicated manner.

Swiss patent 1,307,822 describes a short-circuiting device in which a first electrical line can be short-circuited with a second electrical line by electronic means. This device also requires comparatively complex driving.

It is an object of the present invention to provide a short-circuiting device which is constructed in a simple manner and has short response times.

The object is achieved according to the invention by means of the features of claim 1. Further claims respectively relate to advantageous refinements of the invention.

The invention's device for short-circuiting a first electrical line with a second electrical line has a mechanical switching device by means of which the first electrical line and the second electrical line can be short-circuited. According to the invention, at least one first electronic switching device is arranged in parallel with the mechanical switching device and at least one second electronic switching device is arranged reverse-connected in parallel with the first electronic switching device, in which case a voltage difference that occurs between the first electrical line and the second electrical line can be bridged by at least one of the electronic switching devices. The first electronic switching device switches if the potential of the second electrical line is greater than the potential of the first electrical line by a predeterminable difference value, and the second electronic switching device switches if the potential of the first electrical line is greater than the potential of the second electrical line by a predeterminable difference value.

The device according to claim 1 thus has a mechanical switching unit and an electronic switching unit, which, in terms of their function, are each independent of one another. The mechanical switching unit comprises at least one mechanical switching device and the electronic switching unit is formed by at least one first electronic switching device and also by at least one second electronic switching device. The two switching units are each driven by at least one dedicated independent drive arrangement and, consequently, short-circuit the first electrical line and the second electrical line independently of one another. The drive arrangement of the electronic switching unit, i.e. the drive arrangement of the first electronic switching device and of the second electronic switching device, does not require an auxiliary voltage. If one switching unit fails or the auxiliary voltage fails, the short-circuiting function is thus still ensured—at least at high voltages—by the other switching unit. Optimum protection of people is thus ensured by virtue of the redundancy of the device in accordance with claim 1.

By virtue of at least one first electronic switching device and at least one second electronic switching device, the short-circuiting device defined in claim 1 has a significantly shorter response time. Furthermore, the response behavior of the device according to the invention is independent of the sign of the voltage difference that occurs between the first electrical line and the second electrical line. This improves the protection of people against electric shock and the protection of electronic assemblies connected between rails and grounding installation in the case of railroad power supply installations, since overvoltages between the first electrical line (return line, formed by the rail) and the second electrical line (grounding line) do not occur, or only occur briefly. As a result, damage to the electronic assemblies between rails and grounding installation can be avoided with high probability.

In accordance with a refinement according to claim 2, after the bridging of the first electrical line and of the second electrical line by at least one of the electronic switching devices, the mechanical switching device is additionally triggered by the latter. As a result, in an advantageous manner, the bridging electronic switching device is loaded by the high short-circuit current only for a very short time, since, after the response of the mechanical switching device, the short-circuit current flows exclusively via the mechanical switching device, which can withstand higher current loading.

Within the context of the invention, the power semiconductors in the electronic switching devices may be designed for example as GTO thyristors, as thyristors or as transistors.

In embodiments in accordance with claims 4 and 5, the electronic switching devices are designed as thyristor circuits.

In the embodiment according to claim 4, the thyristor circuit comprises at least one thyristor, whose cathode is connected to the first electrical line and whose anode is connected to the second electrical line. A drive circuit comprising a series circuit formed by breakover diode, triggering series resistor and protection diode is connected to the gate of the thyristor.

In the embodiment according to claim 5, the thyristor circuit comprises at least one thyristor, whose cathode is connected to the second electrical line and whose anode is connected to the first electrical line. A drive circuit comprising a series circuit formed by breakover diode, triggering series resistor and protection diode is connected to the gate of the thyristor.

In accordance with a refinement according to claim 6, a current detecting device is additionally connected upstream of the thyristor, which device drives the mechanical switch. After the closing of the mechanical switching device, the thyristor turns off automatically on account of its being arranged in parallel with the mechanical switching device. By contrast, a GTO thyristor can additionally be forcibly turned off. The device in accordance with claim 6 affords further improved protection against overvoltage damage for the electronic assemblies.

Further advantageous refinements of the invention are explained in more detail using an exemplary embodiment that is illustrated below in the drawing.

In the drawing, 1 designates a first electrical line, which represents the return line in the case of a railroad power supply. In the case of a DC supply, the return line is formed by at least one rail. 2 designates a second electrical line, which forms a grounding line (structure ground) in the exemplary embodiment shown.

A mechanical switching device SM is arranged between the return line 1 and the grounding line 2, it being possible for the return line 1 and the grounding line 2 to be short-circuited by said mechanical switching device.

The mechanical switching device SM comprises a mechanical switch S and also a voltage detecting device FU, which triggers the mechanical switch S (possibly in a time-delayed manner) in the event of an impermissible voltage difference occurring between the two electrical conductors 1 and 2.

According to the invention, at least one first electronic switching device SE1 is arranged in parallel with the mechanical switching device SM and at least one second electronic switching device SE2 is arranged reverse-connected in parallel with the first electronic switching device SE1. The exemplary embodiment illustrated has exactly one first electronic switching device SE1 and exactly one second electronic switching device SE2. The voltage difference between the return line 1 and the grounding line 2 can be bridged by at least one of the electronic switching devices SE1 and SE2. The first electronic switching device SE1 switches if the potential $U2$ of the second electrical line 2 is greater than the potential $U1$ of the first electrical line 1 by a predeterminable difference value, and the second electronic switching device SE switches if the potential $U1$ of the first electrical line 1 is greater than the potential $U2$ of the second electrical line 2 by a predeterminable difference value. In the case of the exemplary embodiment illustrated in the drawing, after the bridging of the first electrical line 1 and of the second electrical line 2, the mechanical switching device SM can additionally be triggered by the first electronic switching device SE1 and/or second electronic switching device SE2, which mechanical switching device then switches in a de-energized fashion.

In the exemplary embodiment illustrated, the electronic switching devices SE1 and SE2 are designed as thyristor circuits.

In the case of the first electronic switching device SE1, the thyristor circuit comprises a thyristor T1, whose cathode is connected to the return line 1. Furthermore, the thyristor T1 is connected to the grounding line 2 by its anode. A drive circuit is connected to the gate of the thyristor T1. In the exemplary embodiment illustrated in the drawing, the drive circuit comprises a protection diode D1, downstream of which a triggering series resistor R1 is connected. A breakover diode BOD1 is connected downstream of the triggering resistor R1.

In the case of the second electronic switching device SE2, the thyristor circuit comprises a thyristor T2, whose cathode is connected to the grounding line 2. Furthermore, the thyristor T2 is connected to the return line 1 by its anode. A drive circuit is connected to the gate of the thyristor T2. The drive circuit comprises a protection diode D2, downstream of which a triggering series resistor R2 is connected. A breakover diode BOD2 is connected downstream of the triggering resistor R2.

The protection diode D1 or D2, respectively, in the drive circuit for the first electronic switching device SE1 or for the second electronic switching device SE2, respectively, can also be omitted. Moreover, instead of the breakover diode BOD1 or BOD2, respectively, it is also possible to use e.g. a zener diode as voltage-detecting component.

Furthermore, in the embodiment shown, a current detecting device FI is connected in series with the electronic switching devices SE1 and SE2 that are arranged reverse-connected in parallel with one another. The mechanical switching device SM is driven by the current detecting device FI.

In the case of the first electronic switching device SE1, the thyristor T1 switches if the grounding line 2 (structure ground) assumes positive potential relative to the return line 1 (railroad ground, rail). This is the case for example when a positive flash of lightning strikes a lightning arrester which is at the potential of the structure ground, or if an overhead-contact wire having a positive voltage relative to the rail falls onto the platform.

In the case of the second electronic switching device SE2, the thyristor T2 switches if the return line 1 (railroad ground, rail) assumes positive potential relative to the grounding line 2 (structure ground) This is the case e.g. when a positive flash of lightning strikes the rail or if an overhead-contact wire having a positive voltage relative to the rail falls onto the rail.

The thyristors T1 and T2 are intended to trigger and connect the return line 1 and the grounding line 2 to one another only in the event of voltage flashovers, i.e. in the event of a fault situation in the railroad power supply installation. The technical requirements made of the thyristors T1 and T2 thus result from the possible short-circuit or grid follow currents.

The magnitude of the grid follow currents is determined both by the distance between the short circuit and the substation and by the contact resistance between the grounding line 2 and the return line 1. In the case of applications in the railroad power supply with, for example, an overhead-contact wire DC voltage of 1500 volts, uninfluenced short-circuit currents of up to 75 kA can thus occur. Thyristors having the highest possible current-carrying capacity should therefore be chosen.

The thyristors T1 and T2 are driven by means of the drive circuit respectively formed by the protection diode D1 and D2, the triggering series resistor R1 and R2, and the breakover diode BOD1 and BOD2. As can be seen from the drawing, the drive circuit is constructed in a simple manner and, in contrast to other electronic drive arrangements, does not require an auxiliary voltage supply.

The triggering voltage chosen for driving the thyristors T1 and T2 is preferably 200–800 volts. This is presently the lowest triggering voltage available as standard in breakover diodes. This triggering voltage is reliably above the operational response voltage of the mechanical switching device SM. On the other hand, this triggering voltage is sufficiently low, however, for the intended improvement of the installation protection.

The triggering series resistors R1 and R2 are to be dimensioned such that, on the one hand, the breakover diodes BOD1 and BOD2 are not destroyed and that, on the other hand, the current pulses are large enough for the driving of the thyristors T1 and T2.

The protection diodes D1 and D2 ensure that the breakover diodes BOD1 and BOD2 are protected against reverse overvoltages.

Via the current detecting device FI, which is connected upstream of the thyristor T1 and downstream of the thyristor T2, the mechanical switching device SM of the short-circuiting device is driven via a potential-free contact. The potential-free contact of the current detecting device FI is in this case closed at a minimum current of 15 amperes, for example.

In the event of the occurrence of short circuits or grid follow currents which cause the grounding line 2 to assume positive potential relative to the return line 1, firstly the thyristor T1 triggers. The thyristor T1 accepts the load current after approximately 1 to 2 microseconds. In the exemplary embodiment described, the mechanical switching device SM connects after approximately 65 milliseconds, for example, and accepts the load current. The thyristor T1 turns off. The complete commutation of the load current from the thyristor T1 to the mechanical switching device SM lasts about 0.5 millisecond.

For the case where the return line 1 assumes positive potential relative to the grounding line 2, firstly the thyristor T2 triggers. The thyristor T2 accepts the load current after approximately 1 to 2 microseconds. After approximately 65 milliseconds, the mechanical switching device SM connects and accepts the load current. The thyristor T2 turns off. The completion commutation of the load current from the thyristor T2 to the mechanical switching device SM lasts about 0.5 millisecond.

The thyristor circuit illustrated in the drawing, with triggering via a breakover diode, acts as a simple and functionally reliable short-circuiting device within approximately 2 microseconds, the current detecting device FI driving the mechanical switching device SM (intertripping circuit). The thyristor T1 or T2, respectively, automatically turns off after the response of the mechanical switching device SM.

What is claimed is:

1. A device for short-circuiting a first electrical line (1) with a second electrical line (2), it being possible for the first electrical line (1) and the second electrical line (2) to be short-circuited by at least one mechanical switching device (SM), characterized by the following features:

at least one first electronic switching device (SE1) is arranged in parallel with the mechanical switching device (SM) and at least one second electronic switching device (SE2) is arranged reverse-connected in parallel with the first electronic switching device (SE1), in which case a voltage difference that occurs between the first electrical line (1) and the second electrical line (2) can be bridged by at least one of the electronic switching devices (SE1, SE2), and the first electronic switching device (SE1) switches if the potential (U2) of the second electrical line (2) is greater than the potential (U1) of the first electrical line (1) by a predeterminable difference value, and the second electronic switching device (SE2) switches if the potential (U1) of the first electrical line (1) is greater than the potential (U2) of the second electrical line (2) by a predeterminable difference value.

2. The short-circuiting device as claimed in claim 1, characterized by the following feature:

after the bridging of the first electrical line (1) and of the second electrical line (2), the mechanical switching device (SM) can additionally be triggered by the first electronic switching device (SE1) and/or by the second electronic switching device (SE2).

3. The short-circuiting device as claimed in claim 2, characterized by the following feature:

after the closing of the mechanical switching device (SM), the first electronic switching device (SE1) and/or the second electronic switching device (SE2) can be switched in a voltage-free fashion.

4. The short-circuiting device as claimed in claim 1, characterized by the following features:

the first electronic switching device (SE1) is designed as a thyristor circuit, in which case the thyristor circuit comprises at least one thyristor (T1), whose cathode is connected to the first electrical line (1) and whose anode is connected to the second electrical line (2), and in which case a drive circuit comprising a series circuit formed by breakover diode (BOD1), triggering series resistor (R1) and protection diode (D1) is connected to the gate of the thyristor (T1).

5. The short-circuiting device as claimed in claim 1, characterized by the following features:

the second electronic switching device (SE2) is designed as a thyristor circuit, in which case the thyristor circuit comprises at least one thyristor (T2), whose cathode is connected to the second electrical line (2) and whose anode is connected to the first electrical line (1), and in which case a drive circuit comprising a series circuit formed by breakover diode (BOD2), triggering series resistor (R2) and protection diode (D2) is connected to the gate of the thyristor (T2).

6. The short-circuiting device as claimed in claim 1, characterized by the following feature:

a current detecting device (FI) is connected in series with the first electronic switching device (SE1) and/or the second electronic switching device (SE2), which current detecting device drives the mechanical switching device (SM) after the bridging of the first electrical line (1) and of the second electrical line (2).

7. The short-circuiting device as claimed in claim 4, characterized by the following feature:

the thyristor (T1; T2) has response times of approximately 1 to 2 microseconds.

8. The short-circuiting device as claimed in claim 4, characterized by the following feature:

the breakover diode (BOD1; BOD2) has a triggering voltage of 200 to 800 volts.

9. The short-circuiting device as claimed in claim 1, characterized by the following feature:

the mechanical switching device (SM) and/or at least one of the electronic switching devices (SE1, SE2) open after a predeterminable time duration.

* * * * *